US008019934B2

(12) United States Patent
Bang et al.

(10) Patent No.: US 8,019,934 B2
(45) Date of Patent: Sep. 13, 2011

(54) OPTICAL DISK DRIVE INCLUDING NON-VOLATILE MEMORY AND METHOD OF OPERATING THE SAME

(75) Inventors: Sung-Kook Bang, Seoul (KR); Jeon-Taek Im, Answong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 658 days.

(21) Appl. No.: 11/764,626

(22) Filed: Jun. 18, 2007

(65) Prior Publication Data

US 2008/0109600 A1 May 8, 2008

(30) Foreign Application Priority Data

Nov. 3, 2006 (KR) .................. 10-2006-0108229

(51) Int. Cl.
*G06F 12/00* (2006.01)
(52) U.S. Cl. ........................ 711/111; 711/113
(58) Field of Classification Search .............. 365/106; 395/404, 440; 713/1, 2; 710/15; 711/103, 711/111–113
See application file for complete search history.

(56) References Cited

U.S. PATENT DOCUMENTS

| 5,537,578 A | 7/1996 | Day, III et al. | |
| 5,603,002 A * | 2/1997 | Hashimoto | 711/113 |
| 5,752,272 A * | 5/1998 | Tanabe | 711/171 |
| 6,496,406 B1 * | 12/2002 | Kitagawa | 365/106 |
| 6,978,345 B2 * | 12/2005 | Tomaszewski et al. | 711/112 |
| 7,117,230 B1 * | 10/2006 | Green et al. | 1/1 |
| 2003/0196110 A1 * | 10/2003 | Lampson et al. | 713/200 |
| 2005/0094524 A1 * | 5/2005 | Chen et al. | 369/53.31 |
| 2005/0240750 A1 * | 10/2005 | Lin | 711/203 |
| 2006/0023558 A1 | 2/2006 | Cho et al. | |
| 2006/0282643 A1 * | 12/2006 | Chandramouli et al. | 711/203 |
| 2008/0219118 A1 * | 9/2008 | Gotoh et al. | 369/53.15 |

FOREIGN PATENT DOCUMENTS

| JP | 11-273224 | 10/1999 |
| KR | 1020050106280 | 11/2005 |

OTHER PUBLICATIONS

Overwrite Protection Method for FLASH memory, Sep. 1, 1993, IBM Technical Disclosure Bulletin, US, vol. 36 pp. 1-2.*
"Flash Memory," http://en.wikipedia.org/wiki/Flash_memory.*
"Disk Sector," http://en.wikipedia.org/wiki/Disk_sector.*
English Abstract for Publication No. 11-273224.

* cited by examiner

*Primary Examiner* — Shane M Thomas
(74) *Attorney, Agent, or Firm* — F. Chau & Associates, LLC

(57) ABSTRACT

An optical disk drive includes a non-volatile memory. The optical disk drive is booted based on driving information stored in the non-volatile memory. When a write command is received from a host, the optical disk drive stores data to be recorded in an optical medium in the non-volatile memory and then writes the data in the optical medium independent of the host.

19 Claims, 6 Drawing Sheets

OPTICAL DISK DRIVE INCLUDING NON-VOLATILE MEMORY AND METHOD OF OPERATING THE SAME

CROSS-REFERENCE TO RELATED PATENT APPLICATION

This application claims priority to Korean Patent Application No. 10-2006-0108229, filed on Nov. 3, 2006, in the Korean Intellectual Property Office, the disclosure of which is hereby incorporated by reference in its entirety.

BACKGROUND OF THE INVENTION

1. Technical Field

The present invention relates to an optical disk drive (ODD), and more particularly, to an ODD including a non-volatile memory and a method of operating the same.

2. Discussion of the Related Art

FIG. 1 is a block diagram of a conventional optical disk drive (ODD) 100. FIG. 2 illustrates a schematic flow in which data is recorded in an optical medium by the conventional ODD 100. Referring to FIG. 1, the ODD 100 includes a booting memory 110, a controller 120, and a buffer memory 130.

The controller 120 boots the ODD 100 based on driving information (DI) received from the booting memory 110. The booting memory 110 is usually implemented by non-volatile memory, e.g., read-only memory (ROM).

Referring to FIGS. 1 and 2, the ODD 100 executes a write command on an optical medium. Firstly, the controller 120 generates a control signal CS based on a command CMD received from a host. Next, the buffer memory 130 buffers data, which is received from the host and is to be recorded in the optical medium, in response to the control signal CS.

The buffer memory 130 is usually implemented by synchronous dynamic random access memory (SDRAM). The capacity of the buffer memory 130 is much smaller than that of the optical medium. Accordingly, when data to be recorded in the optical medium is larger than the capacity of the buffer memory 130, the data (e.g., having a size of M×N bytes) is divided into a plurality of segments in units of N bytes corresponding to the capacity of the buffer memory 130 and temporarily stored in the buffer memory 130 before being recorded in the optical medium.

Next, write operation of the buffered data is executed. The above-described procedure is repeated based on the control of the host until write operation is completed with respect to all data to be recorded in the optical medium.

Similarly, when the ODD 100 executes a read command, data is read from the optical medium and buffered by the buffer memory 130 in units of N bytes corresponding to the capacity of the buffer memory 130. The read and buffering operations are repeated.

However, the repeated reading and buffering causes time loss and also results in the decrease of system performance since a central processing unit (CPU) of the host and a portion of memory resources are continuously used. Moreover, the booting memory 110 must be capable of storing the DI, which increases the price of the ODD 100.

SUMMARY OF THE INVENTION

Some exemplary embodiments of the present invention provide an optical disk drive including non-volatile memory. The non-volatile memory stores driving information, stores data to be recorded in an optical medium, and then outputs the stored data based on a write speed of the optical medium without having to be controlled by a central processing unit (CPU) of a host.

According to some exemplary embodiments of the present invention, an optical disk drive is provided. The optical disk drive includes a controller and a non-volatile memory. The controller generates a first control signal based on driving information and a command received from a host. The non-volatile memory outputs the driving information and buffers data received from the host and data read from an optical medium in response to the first control signal. The driving information may include a booting code for booting the optical disk drive and a drive file for driving the optical disk drive.

The non-volatile memory may store data received from the host or data read from the optical medium in response to the first control signal, divide the stored data into a plurality of blocks, and then output the stored data in block units.

The controller may determine, based on the command received from the host, whether to write data, which is received from the host and stored in the non-volatile memory in the optical medium, and whether to read data from the optical medium or the non-volatile memory.

The non-volatile memory may output data stored therein based on the first control signal received from the controller without being controlled by the host.

According to exemplary embodiments of the present invention, a method of operating an optical disk drive including a non-volatile memory is provided. The method includes booting the optical disk drive based on driving information stored in the non-volatile memory. A first control signal is generated based on a command received from a host. Data received from the host in the non-volatile memory is stored in response to the first control signal. The data stored in the non-volatile memory is written to an optical medium in units of blocks.

The writing of the data to the optical medium may include determining whether to output the data stored in the non-volatile memory based on the command received from the host. The data stored in the non-volatile memory is output in response to the first control signal without being controlled by the host. The data output from the non-volatile memory is encoded in response to a second control signal output from a controller. The encoded data is written to the optical medium.

The method may further include outputting data stored in the non-volatile memory to the host in response to the first control signal.

The method may further include determining whether to read data from the optical medium based on the command received from the host. The data read from the optical medium is decoded in response to the second control signal. The decoded data is stored in the non-volatile memory in response to the first control signal.

The outputting of the data stored in the non-volatile memory is performed based on the first control signal received from the controller without control by the host.

BRIEF DESCRIPTION OF THE DRAWINGS

The above and other features of exemplary embodiments of the present invention will become more apparent by describing exemplary embodiments of the present invention in detail with reference to the attached drawings in which.

DETAILED DESCRIPTION OF THE EXEMPLARY EMBODIMENTS

Figure 1:
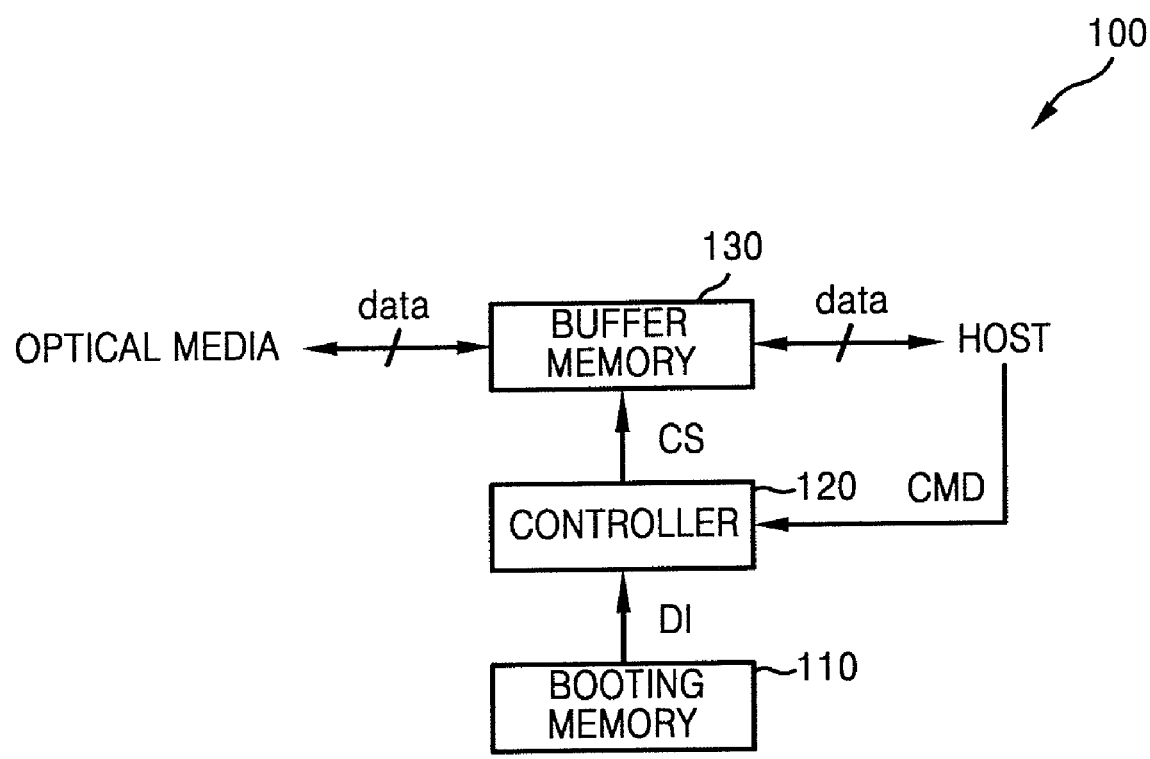
FIG. 1 is a block diagram of a conventional optical disk drive (ODD)
Figure 2:
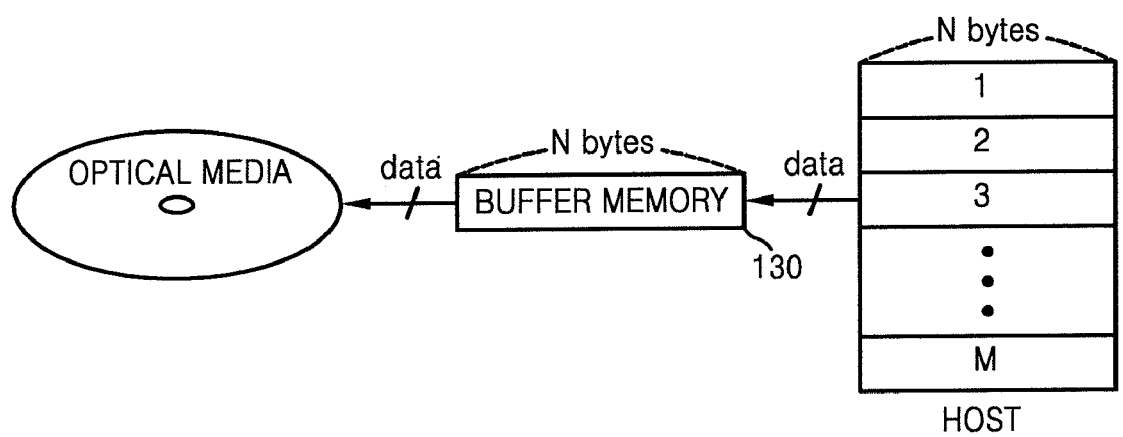
FIG. 2 Illustrates a schematic flow in which data is recorded in an optical medium by a conventional ODD.

Exemplary embodiments of the present invention now will be described more fully hereinafter with reference to the accompanying drawings. This invention may, however, be embodied in many different forms and should not be construed as limited to the exemplary embodiments set forth herein. In the drawings, the size and relative sizes of layers and regions may be exaggerated for clarity. Like numbers may refer to like elements throughout.

It will be understood that when an element is referred to as being "connected" or "coupled" to another element, it can be directly connected or coupled to the other element or intervening elements may be present.

Figure 3:
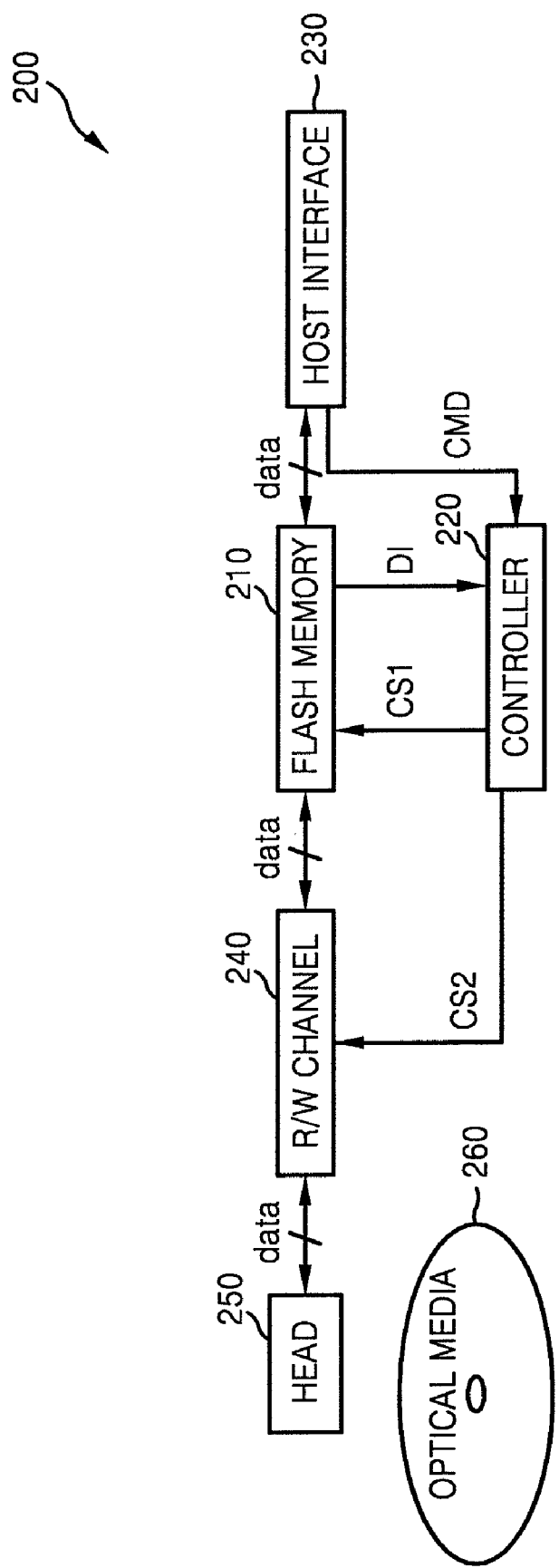
FIG. 3 is a block diagram of an ODD according to some exemplary embodiments of the present invention.

FIG. 3 is a block diagram of an optical disk drive (ODD) 200 according to some exemplary embodiments of the present invention. The ODD 200 includes a non-volatile memory 210, a controller 220, a read/write (R/W) channel 240, and a head 250. The non-volatile memory 210 may be an electrically erasable and programmable (or writable) memory, for example, a flash memory.

When a power supply voltage is applied to the ODD 200, the flash memory 210 outputs driving information (DI) stored therein and the controller 220 boots the ODD 200 based on the DI. The DI includes a booting code for booting the ODD 200 and a drive file for driving the ODD 200. Accordingly, the ODD 200 does not need the additional booting memory 130 illustrated in FIG. 1 to store the DI.

The controller 220 generates a first control signal CS1 and a second control signal CS2 based on a command CMD received from a host (not shown) through a host interface 230. The command CMD may be a write command for writing data in an optical medium 260 or the flash memory 210 or a read command for reading data from the optical medium 260 or the flash memory 210. The controller 220 may determine, based on the command CMD received from the host, whether to store data received from the host in the flash memory 210 or in the optical medium 260 via the flash memory 210. Also, the controller 220 may determine, based on the command CMD received from the host, whether to read data from the optical medium 260 or the flash memory 210. The flash memory 210 as well as the optical medium 260 can be used as a separate storage medium.

The flash memory 210 buffers data received from the host via the host interface 230 or data read from the optical medium 260 in response to the first control signal CS1. The buffer memory 130 of the conventional ODD 100 illustrated in FIG. 1 is replaced with the flash memory 210.

The R/W channel 240 encodes data buffered by the flash memory 210 and/or decodes data read from the optical medium 260 in response to the second control signal CS2. The head 250 reads data from the optical medium 260 or writes data encoded by the R/W channel 240 in the optical medium 260.

Figure 4:
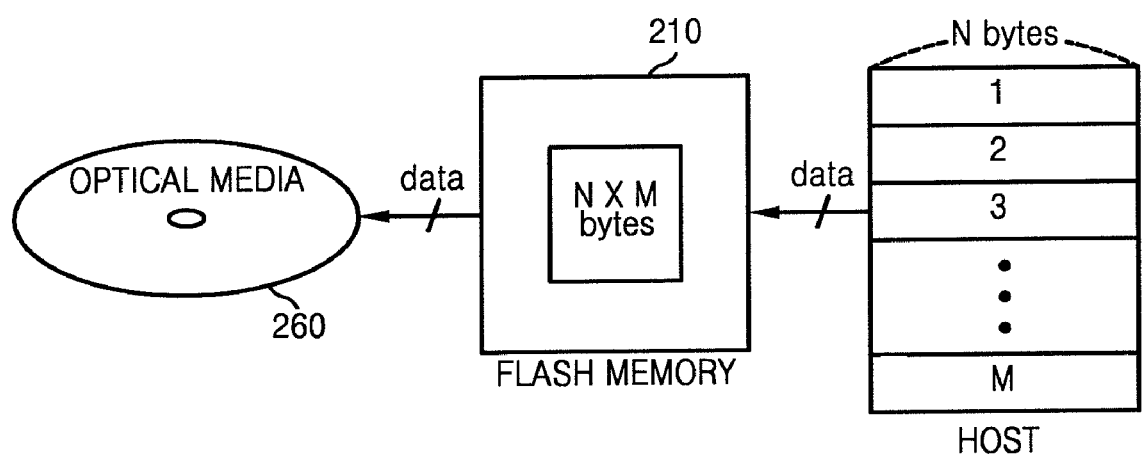
FIG. 4 illustrates a schematic flow in which data is recorded in an optical medium by an ODD according to some exemplary embodiments of the present invention.
Figure 5:
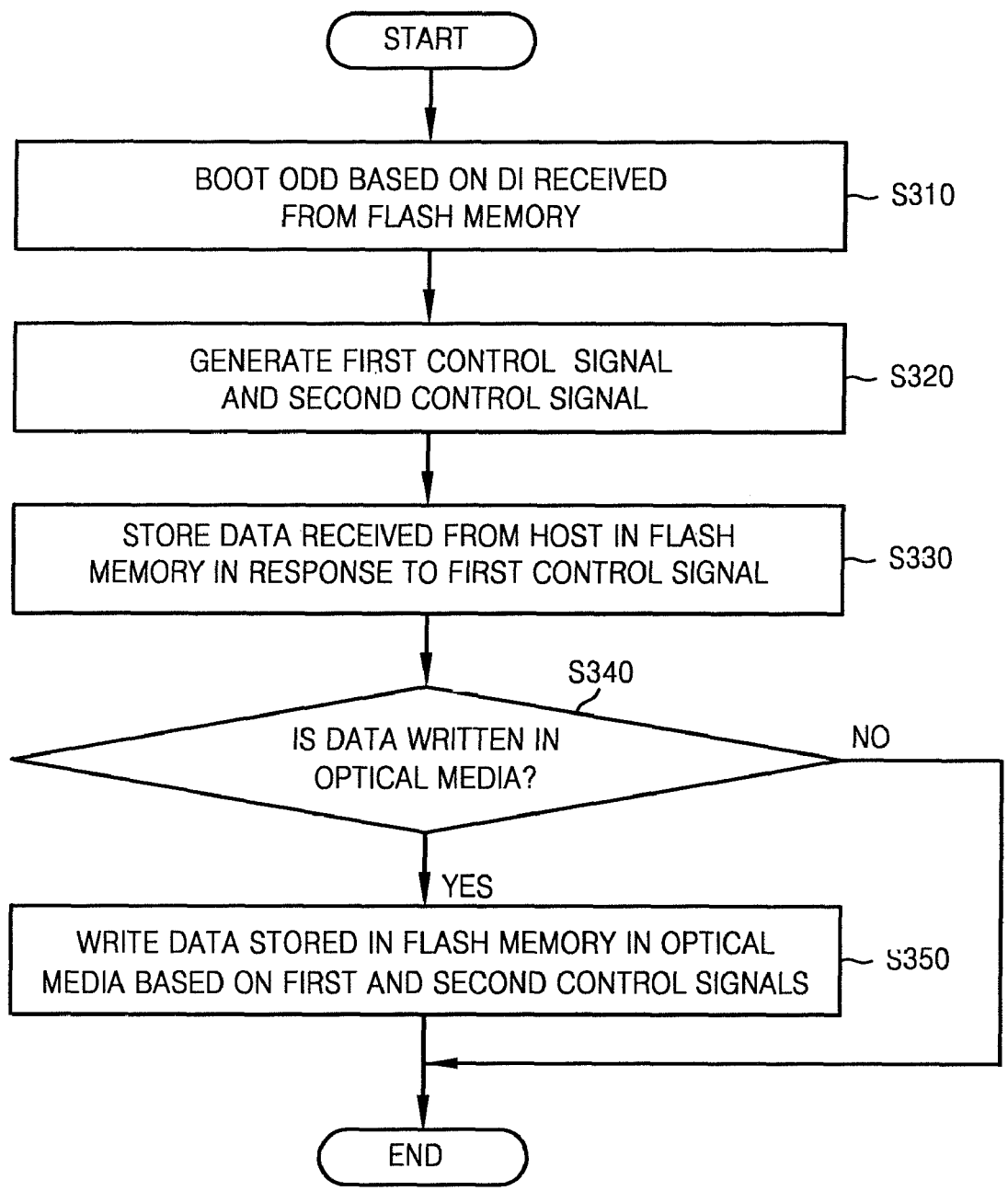
FIG. 5 is a flowchart of a procedure in which an ODD executes a write command, according to some exemplary embodiments of the present invention.
Figure 6:
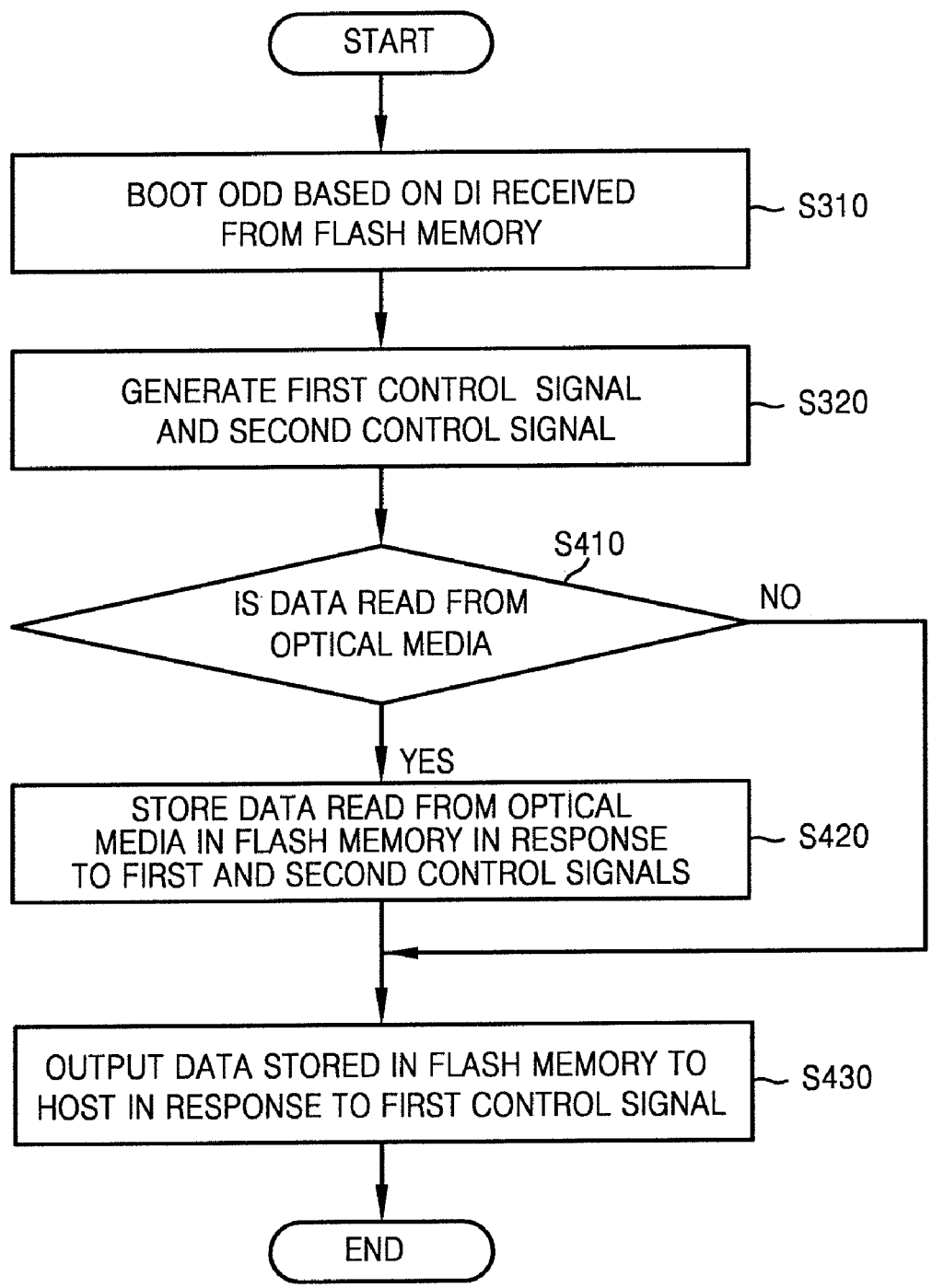
FIG. 6 is a flowchart of a procedure in which an ODD executes a read command, according to some exemplary embodiments of the present invention.

FIG. 4 illustrates a schematic flow in which data is recorded in the optical medium 260 by the ODD 200, according to some exemplary embodiments of the present invention. FIG. 5 is a flowchart of a procedure in which the ODD 200 executes a write command, according to some exemplary embodiments of the present invention. FIG. 6 is a flowchart of a procedure in which the ODD 200 executes a read command, according to some exemplary embodiments of the present invention.

The procedure in which the ODD 200 executes a write command is described below with reference to FIGS. 1 through 5. In operation S310, the controller 220 boots the ODD 200 based on DI received from the flash memory 210. In operation S320, the controller 220 generates the first control signal CS1 and the second control signal CS2 based on the DI and the write command received from the host.

In operation S330, the flash memory 210 stores data, which is received from the host to be recorded in the optical medium 260, in response to the first control signal CS1. Referring to FIG. 4, all of the data (e.g., having a size of M×N bytes) to be recorded in the optical medium 260 is stored in the flash memory 210. Since all of the data received from the host is stored in the flash memory 210, the ODD 200 does not need to perform interactive operations of receiving data form the host and buffering the data using the buffer memory 130, which are performed by the conventional ODD 100. In addition, when the data received from the host is stored in the flash memory 210, the ODD 200 executes the write command based on the control of the controller 220 without being controlled by the host. Accordingly, the ODD 200 may minimize both time loss and the decrease in system performance which occur In the conventional ODD 100.

In operation S340, the controller 220 determines, based on the write command, whether to store the data in the flash memory 210 or the optical medium 260. The flash memory 210 as well as the optical medium 260 can be used as a separate storage medium.

When the data is stored in the optical medium 260 (Yes, operation S340), the flash memory 210 outputs the data in units of blocks (e.g., block units having the same size as the a sector of the optical medium 260) based on a writing speed of the optical medium 260 in response to the first control signal CS1. The R/W channel 240 encodes the data output from the flash memory 210 in response to the second control signal CS2. The head 250 writes the encoded date in the optical medium 260 in operation S350.

The writing speed of the optical medium 260 may be, for example, 1.2 MB/sec at a speed factor 8 and 2.4 MB/sec at a speed factor 16. The writing speed of the flash memory 210 may be, for example, 11.9 MB/sec when the flash memory 210 is a single level cell NAND flash memory (1-channel) and 23.8 MB/sec when the flash memory 210 is a multi-level cell NAND flash memory (2-channel). Accordingly, the flash memory 210 can quickly store data received from the host and then output the stored data based on the writing speed of the optical medium 260.

A procedure in which the ODD 200 executes a read command is described below with reference to FIGS. 1 through 6. In operation S310, the controller 220 boots the ODD 200 based on DI received from the flash memory 210. In operation S320, the controller 220 generates the first control signal CS1 and the second control signal CS2 based on the DI and the read command received from the host. In operation S410, the controller 220 determines, based on the read command, whether to read data from the flash memory 210 or the optical medium 260. The flash memory 210 as well as the optical medium 260 can be used as a separate storage medium.

When data is read from the flash memory 210 (No, operation S410), the flash memory 210 outputs data stored therein to the host in response to the first control signal CS1 in operation S430. When data is read from the optical medium 260 (Yes, operation S410), in operation S420 the head 250 reads data from the optical medium 260, the R/W channel 240 decodes the data read from the optical medium 260 in response to the second control signal CS2, and the flash memory 210 stores the decoded data in response to the first control signal CS1.

Since all of the data read from the optical medium 260 is stored in the flash memory 210, the ODD 200 does not need to perform iterative operations of reading data form an optical medium and buffering the data using the buffer memory 130, which are performed by the conventional ODD 100 illustrated in FIG. 1.

In operation S430, the flash memory 210 outputs the stored data to the host in response to the first control signal CS1.

As described above, according to some exemplary embodiments of the present invention, a special booting memory is not required, time loss occurring during execution of a write command and a read command is reduced, and the decrease of system performance is minimized.

While exemplary embodiments of the present invention have been shown and described herein, it will be understood by those of ordinary skill in the art that various changes in form and detail may be made herein without departing from the spirit and scope of the present invention.

What is claimed is:

1. An optical disk drive comprising:
   a controller configured to generate a first control signal based on driving information and a command received from a host; and
   a non-volatile memory configured to output the driving information and to buffer data received from the host and data read from an optical medium in response to the first control signal,
   wherein the controller determines, based on the command received from the host, whether to write data, which is received from the host, in the optical medium or the non-volatile memory and whether to read data from the optical medium or the non-volatile memory, and
   wherein the non-volatile memory both buffers data and functions as a separate storage device.

2. The optical disk drive of claim 1, wherein the non-volatile memory outputs data stored therein to the optical medium based on the first control signal received from the controller independent of the host.

3. The optical disk drive of claim 2, wherein the driving information comprises a booting code for booting the optical disk drive and a drive file for driving the optical disk drive.

4. The optical disk, drive of claim 3, wherein the non-volatile memory stores data received from the host or data read from the optical medium in response to the first control signal, divides the stored data into a plurality of blocks, and then outputs the stored data in block units.

5. The optical disk drive of claim 4, wherein each of the plurality of blocks has the same size as a sector of the optical medium.

6. The optical disk drive of claim 2, wherein the non-volatile memory is a NAND flash memory.

7. The optical disk drive of claim 2, further comprising:
   a read/write channel configured to encode data buffered by the non-volatile memory and decode data read from the optical medium in response to a second control signal output from the controller; and
   a head configured to read data from the optical medium and to write data encoded by the read/write channel in the optical medium.

8. A method of operating an optical disk drive including a non-volatile memory, the method comprising:
   booting the optical disk drive based on driving information stored in the non-volatile memory;
   generating a first control signal based on a command received from a host;
   buffering data received from the host and data read from an optical medium in response to the first control signal; and
   determining, based on the command received from the host, whether to write data, which is received from the host, in the optical medium or the non-volatile memory and whether to read data from the optical medium or the non-volatile memory, and
   wherein the non-volatile memory both buffers data and functions as a separate storage device.

9. The method of claim 8, wherein further comprising writing the data, which is received from the host, in the non-volatile memory; and
   outputting the data stored in the non-volatile memory in units of blocks in response to the first control signal independent of the host.

10. The method of claim 9, wherein each of the blocks has the same size as a sector of the optical medium.

11. The method of claim 9, further comprising encoding the data output from the non-volatile memory in response to a second control signal output from a controller and writing the encoded data in the optical medium.

12. The method of claim 9, further comprising:
   decoding the data read from the optical medium in response to second control signal output from a controller; and
   storing the decoded data in the non-volatile memory in response to the first control signal.

13. The method of claim 8, further comprising:
   decoding the data read from the optical medium in response to a second control signal output from a controller; and
   storing the decoded data in the non-volatile memory in response to the first control signal.

14. A method for accessing an optical medium comprising:
   generating a first control signal based on driving information and a command received from a host;
   outputting the driving information and buffering data received from the host and data read from an optical medium in response to the first control signal using a non-volatile memory; and
   determining, based on the command received from the host, whether to write data, which is received from the host, in the optical medium or the non-volatile memory and whether to read data from the optical medium or the non-volatile memory, and
   wherein the non-volatile memory both buffers data and functions as a separate storage device.

15. The method of claim 14, further comprising writing the data, which is received from the host, in the non-volatile memory; and
   outputting the data stored in the non-volatile memory in units of blocks in response to the first control signal independent of the host.

16. The method of claim 15, wherein the non-volatile memory stores data received from the host or data read from the optical medium in response to the first control signal, divides the stored data into a plurality of blocks, and then outputs the stored data in block units.

17. The method of claim 16, wherein each of the plurality of blocks has the same size as a sector of the optical medium.

18. The method of claim 15, wherein the driving information comprises a booting code for booting the optical disk drive and a drive file for driving the optical disk drive.

19. The method of claim 15, further comprising:
   encoding data buffered by the non-volatile memory and decoding data read from the optical medium in response to a second control signal output from the controller; and
   reading data from the optical medium and writing data encoded by the read/write channel in the optical medium.

* * * * *